United States Patent [19] [11] 4,169,101

Ucciani et al. [45] Sep. 25, 1979

[54] PROCESS OF SELECTIVE HYDROGENATION OF VEGETABLE OILS

[75] Inventors: Eugéne Ucciani, Marseilles; Guy Devinat, La Gavotte; Georges Cecchi; Maurice Naudet, both of Marseilles, all of France

[73] Assignee: Institut des Corps Gras (I.T.E.R.G.), Paris, France

[21] Appl. No.: 882,582

[22] Filed: Mar. 2, 1978

Related U.S. Application Data

[63] Continuation-in-part of Ser. No. 778,886, Mar. 18, 1977, abandoned, which is a continuation of Ser. No. 563,140, Mar. 28, 1975, abandoned.

[30] Foreign Application Priority Data

Apr. 12, 1974 [FR] France .............................. 74 12929

[51] Int. Cl.[2] .......................... C11C 3/12; B01J 31/02

[52] U.S. Cl. ...................................... 260/409; 252/430

[58] Field of Search ................ 260/409; 423/417, 418; 252/430

[56] References Cited

U.S. PATENT DOCUMENTS

| | | | |
|---|---|---|---|
| 1,251,201 | 12/1917 | Ellis | 252/430 |
| 1,390,683 | 9/1921 | Ellis | 252/430 |
| 1,390,688 | 9/1921 | Ellis | 252/411 R |
| 2,477,553 | 7/1949 | McKeever | 423/417 |

OTHER PUBLICATIONS

Chemical Abstracts, Cecchi et al., vol. 77, No. 151243x, (1972).

*Primary Examiner*—John Niebling
*Attorney, Agent, or Firm*—Brooks, Haidt, Haffner & Delahunty

[57] ABSTRACT

This invention relates to a process of selective hydrogenation of vegetable oils in the presence of a catalytic agent containing micrometallic cobalt dispersed in a glyceride fat matrix.

12 Claims, No Drawings

PROCESS OF SELECTIVE HYDROGENATION OF VEGETABLE OILS

This application is a continuation-in-part of our co-pending patent application Ser. No. 778,886, filed Mar. 18, 1977, now abandoned, which is a continuation of our patent application Ser. No. 563,140, filed Mar. 28, 1975, now abandoned.

BACKGROUND OF THE INVENTION

The present invention relates to processes for the selective hydrogenation of vegetable oils in the presence of a catalytic agent containing micrometallic cobalt dispersed in a glyceride fat matric, and more particularly, the cobalt in the catalyst is separable from the hydrogenation product by the use on it of magnetic attraction and the hydrogenation products are edible products.

Numerous processes for selectively hydrogenating oils are already known. Use is very often made of the heterogeneous catalysis by reduced and activated metals, employed as they are or on a support, under particular conditions. From the most important of these catalysts, the systems based on copper, nickel, chromium may be cited. The principal disadvantageous found in such processes include losing their activity in the presence of poisons contained in the crude oils, such as certain non-glyceridic constituents; the considerable variation in quality of the catalysts depending on the conditions of manufacture; and after the hydrogenation is terminated, the protracted and difficult elimination of the catalyst, so that the catalyst cannot be immediately reused, or even regenerated in certain cases.

Attempts have been made to solve these problems by refining preceding the hydrogenation; varying the quality of the catalyst; separation of the catalyst from the hydrogenation products.

A process is also known for the preparation of a catalyst, as shown in Ellis, U.S. Pat. No. 1,390,683, who works only with nickel compounds. Such compounds are extremely toxic and thus have never been used for the selective hydrogenation of vegetable oils to obtain edible products: One percent of nickel in the human body causes cancer. These catalysts were fats, for hardening oils having low melting points to obtain facts, such as lubricants and other products not destined for human consumption. They were not utilized for selective hydrogenation to obtain edible products.

The showing of Ellis is also contrary to the present invention in the choice of catalyst support. Ellis, in effect, requires an inert product which does not produce a saponifiable product in the reaction environment. Glycerides are particularly excluded.

The Ellis catalyst is prepared above all for its storage prior to use. Moreover, it is proven pyrophoric. Once used, it is poisoned, and thus cannot be reused.

THE INVENTION

The present invention is novel and is not obvious from the knowledge of the art because the instant process relates to selective hydrogenation of vegetable oils, to obtain edible products meeting the criterion of non-toxicity, in the presence of a heretofore unknown catalyst, the catalyst being separated, after the hydrogenation, from the hydrogenated products by magnetic attraction and immediately being reusable for a further selective hydrogenation.

The present invention comprises the following steps:

(1) Preparation of the catalytic material starting from dicobalt octacarbonyl and vegetable oil under hydrogen pressure and at an elevated temperature to obtain, after cooling and homogenization, a solid catalyst product;

(2) Selective hydrogenation of a vegetable oil under hydrogen pressure and at an elevated temperature in the presence of the aforesaid catalyst;

(3) Separation of the cobalt from the hydrogenated products and recovery of the catalyst by magnetic means.

Accordingly, the present invention involves selective hydrogenation of unsaturated vegetable oils, such as soybean, linseed, rapeseed, cottonseed, and sunflower seed oils, the final product being edible.

"Selective hydrogenation" of vegetable oils is understood to mean an operation characterized by a preferential addition of hydrogen to the most unsaturated constituents; no hydrogen being fixed to the least unsaturated constituents.

The primary advantages of the invention beyond the reduction in the number of hydrogenation steps, and as a result reduction of the cost of operation, are obtaining products of better quality with a greater yield and the economic improvement of the process due to the immediate recovery of the cobalt at the end of the operation without the numerous and difficult steps of regeneration. Another benefit of the invention is a new method for preparing dicobalt octacarbonyl which is obtained dispersed in a totally hydrogenated vegetable oil in an almost quantitative yield, economically and with reduced risks. The pressure and the temperature are much lower than in the known methods, and purification of the final catalyst product is unnecessary. The decomposition of the final catalyst product, to which can optionally be added a supplement of hydrogenated palm oil, permits direct production of the catalyst mass having greater activity with excellent yield.

The magnetic properties of the cobalt enable it to be easily recovered at the end of the reaction by a magnet in the laboratory and by an electromagnet in industry. Compared with known methods, the present invention necessitates a simplified apparatus and reduces the duration of the operation and consequently its cost. An adaptation to uninterrupted operations may be provided for.

The products obtained at the end of operation have not lost their natural qualities: the major part of the double bonds of the monoenes remain localized in the central positions of the chain: the linolenic acid is considerably reduced, below 2.5%, the linoleic acid is maintained in good proportions, and cobalt remains only infinitesimal in traces, which, most of the time, are difficult to detect.

The appearance of geometric isomers causes the melting point to rise. According to the degree of hydrogenation, this allows either the production of fluid oils or of semiconcrete products. In addition to the application to the manufacture of bases for margarines and frying fats, mention may also be made of those applications of fatty acid mixtures for industrial uses, such as the synthesis of amines, this example cited by way of non-limiting example.

The invention will be more readily understood on reading the following description.

The values indicated in the results of the following tests are only approximate in view of the minimum of errors committed in the calculation.

The process of selective hydrogenation of vegetable oils uses, as catalyst, micrometallic cobalt dispersed in a fat matrix. Different tests are described hereinafter.

The catalytic preparation is manufactured in the following manner:

The dicobalt octacarbonyl is decomposed by hydrogen when hot. The metal was taken to the reduced state in paramagnetic micrometallic form and of high catalytic activity. Said metal is stabilized by coating it in an inert mass. This offers the advantage, in addition to that of facilitating manipulations and of ensuring its conservation, of enabling the hydrogenation to be controlled.

It has been proven, according to a first embodiment, that the final catalytic product obtained by synthesis of dicobalt octacarbonyl can be directly used without purification and decomposition thereof to obtain the catalyst product.

Synthesis of $Co_2(CO)_8$

The octacarbonyl is made under high hydrogen and carbon monoxide pressure in an autoclave, with stirring, starting from cobalt carbonate and vegetable oil. The vegetable oil is preferably hydrogenated palm oil which is desirably refined and comminuted. This hydrogenated oil thus no longer contains any unsaturated fatty acids.

A Pyrex tube is charged with 2 g of cobalt carbonate, 5g of refined palm oil, hydrogenated and comminuted as set forth above, and 30 mg of cobalt octacarbonyl crystals, and the tube is placed in an autoclave which can be agitated by rocking. The autoclave (provided with a system for the introduction of gas under pressure) is closed and placed in a heating oven.

The autoclave is agitated and purged four times with hydrogen under a 10 bar pressure totally to eliminate air. Then, hydrogen is introduced under a pressure of 65 bars, as is carbon monoxide under 65 bars of pressure. The autoclave thus contains about 6.5 L of hydrogen and 6.5 L of carbon monoxide.

The pressure in the autoclave at 20° C. is 130 bars. The autoclave is then heated and, after one hour of heating, the temperature rises to 160° C., this being the synthesis temperature for the $Co_2(CO)_8$. At this time the pressure is 176 bars. After about 10 minutes a lowering of the pressure commences, showing the beginning of the synthesis of $Co_2(CO)_8$. This very rapid pressure drop begins to slow down after about 15 minutes and the pressure stabilizes at 158 bars.

After completion of cooling by immersion in a cold water bath, the pressure reading at 20° C. is 150 bars. The autoclave is then depressurized and it is possible to recover the reaction product. The major portion of the product is compacted in the form of a maroon cylinder in the base of the tube. The weight of the tube before and after reaction shows a loss of 6%, compared to the expected weight of cobalt octacarbonyl in case of the total conversion of the cobalt carbonate.

The product obtained is removed from the tube, ground in a mortar and homogenized, and dissolved to the extent of 5% in lightly heated hexane. The solution obtained has a maroon color but is clear. No residue of cobalt carbonate is observed. The conversion to cobalt octacarbonyl is substantially total.

The product obtained must be kept under an atomsphere of nitrogen or of carbon monoxide at 0° C. to obviate its carbonation back to cobalt carbonate by the air.

Preparation of the Catalytic Product

The starting material is the product obtained above, that is, cobalt octacarbonyl dissolved in hydrogenated palm oil, to which a supplement of the same palm oil is optionally added. This is done under hydrogen pressure at a temperature permitting decomposition of the cobalt complex and with efficient agitation.

A reactor having an efficient T-shaped agitation, turning at about 900 rpm, is charged with 7 g of the finely ground material obtained above and 3 g of hydrogenated palm oil. After four purges under a 10-bar hydrogen pressure with moderate agitation, the pressure in the reactor is brought to 18 bars of hydrogen.

The temperature of the reaction environmental is raised from 20° to 150° C. in 10 minutes. The pressure rises steadily up to 31 bars after stabilization of the temperature. After one hour of agitation at 900 rpm and 150° C., there is no longer an increase of the pressure beyond 31 bars. The decomposition of the cobalt octacarbonyl is judged to be complete.

The catalytic mass is homogenized under agitation until solidification of the product mass under strong cooling. After completion of the cooling at room temperature, the solid catalytic mass obtained is removed from the reactor and finely comminuted.

The powder obtained after grinding is very deep black. In 5% solution in hexane, the powder shows the presence of very finely divided metallic cobalt which settles slowly. If a magnetic field is applied by use of a permanent magnet, the cobalt orients itself in the form of very fine needles along the magnetic lines of force.

The solution of this powder in hexane is colorless and clear. From this, it is therefore apparent that the cobalt octacarbonyl has been decomposed into the form of metallic cobalt. Otherwise, the tiniest trace of the octacarbonyl would be revealed by a characteristic brown coloration in the hexane solution.

The quantity of cobalt in the powder obtained is determined by a series of tests, and 9% cobalt, expressed by weight of metal compared to the total weight of the powder, is found. The theoretical percentage is 9.9% cobalt, so the yield obtained by the different tests is 90% cobalt.

A similar refined soybean oil having an acidity of 0.04% is hydrogenated with the catalytic product obtained above containing 9% cobalt. In certain tests the weight percentage of catalyst with respect to the oil to be hydrogenated is 1.1%. There is thus 0.1% of cobalt in the reaction medium. This latter amount varies between 0.025 and 0.1% for the different tests set forth hereafter in Table I.

The hydrogenation is carried out at a temperature above 150° C., a hydrogen pressure of 5 to 20 bars with agitation at the preferred 900 rpm, with one test being carried out at 450 rpm.

The results of these hydrogenations are given in Table I, showing the percentage of cobalt, the operating conditions, the final composition, the iodine value, IV, and the activity. The percentage of cobalt in the table is the weight of metal with respect to the weight of oil to be hydrogenated. The IV is an indicium of the unsaturation of the fatty material; the higher it is, the greater the quantity of non-hydrogenated products.

The activity is expressed on the basis of IV per minute and per percent cobalt. The final composition is expressed in the weight of the component with respect to the weight of the total material.

HYDROGENATION

The mode of operation is as follows for all the tests mentioned hereinafter: 5 g of oil and a quantity of cata-

TABLE I

HYDROGENATION OF REFINED SOYBEAN OIL

| Test No. | OPERATING CONDITIONS % Co | $PH_2$ | T (°C.) | Agitation (rpm) | Time (min) | IV | FINAL COMPOSITION (g/100 g) C16:0 | C18:0 | C18:1 | C18:2 | C18:3 | C20 | Trans | Activity ΔIV/%Co/-min) |
|---|---|---|---|---|---|---|---|---|---|---|---|---|---|---|
| 1 | 0.100 | 20 | 200 | 900 | 10 | 83.0 | 10.6 | 11.0 | 58.9 | 18.1 | 0.6 | 0.8 | 45.8 | 51.0 |
| 2 | 0.050 | " | " | " | 30 | 72.5 | 10.6 | 19.7 | 53.9 | 14.6 | 0.4 | 0.6 | 40.0 | 41.0 |
| 3 | 0.025 | " | " | " | 60 | 67.0 | 10.3 | 25.2 | 49.6 | 13.9 | 0.4 | 0.6 | 37.5 | 44.0 |
| 4 | 0.050 | 20 | 200 | 900 | 30 | 72.5 | 10.6 | 19.7 | 53.9 | 14.6 | 0.4 | 0.6 | 40.0 | 40.0 |
| 5 | " | 10 | " | " | 45 | 74.5 | 10.6 | 17.1 | 56.4 | 14.8 | 0.4 | 0.7 | 43.6 | 25.8 |
| 6 | " | 5 | " | " | 105 | 74.5 | 10.6 | 20.0 | 52.7 | 16.5 | 0.5 | 0.6 | 42.0 | 11.1 |
| 7 | 0.050 | 20 | 200 | 900 | 30 | 72.0 | 10.6 | 19.7 | 53.9 | 14.6 | 0.4 | 0.6 | 40.0 | 40.0 |
| 8 | " | " | 190 | " | 30 | 70.0 | 10.5 | 21.2 | 53.7 | 13.4 | 0.4 | 0.7 | 36.7 | 42.0 |
| 9 | " | " | 180 | " | 40 | 76.0 | 10.5 | 18.1 | 53.5 | 16.9 | 0.4 | 0.6 | 39.5 | 28.5 |
| 10 | 0.050 | 20 | 200 | 900 | 30 | 72.5 | 10.6 | 19.7 | 53.9 | 14.6 | 0.4 | 0.6 | 40.0 | 40.0 |
| 11 | " | " | " | 450 | 40 | 90.0 | 10.5 | 10.7 | 53.7 | 23.6 | 0.9 | 0.6 | 40.8 | 21.5 |
| 12 | 0.100 | 10 | 180 | 900 | 40 | 84.5 | 10.7 | 10.0 | 58.3 | 19.9 | 0.5 | 0.6 | 50.6 | 12.0 |
| Control | — | — | — | — | — | 133.0 | 10.7 | 3.6 | 23.1 | 53.7 | 8.1 | 0.7 | — | — |

It can be seen from Table I that certain parameters give superior results and are accordingly preferred. Thus, very good results are obtained with 0.025 to one percent cobalt at 180°-200° C. and 5-20 bars of hydrogen pressure.

In another embodiment of this invention, dicobalt octacarbonyl prepared according to the prior art is used.

PREPARATION OF THE CATALYTIC MASS

A $Co_2(CO)_8$ is decomposed in a vegetable oil under hydrogen pressure, at high temperature.

In a preferred embodiment the same oil is taken as the one which is intended to be hydrogenated, in order not to introduce other foreign bodies in the reaction medium. The problem of recovery therefore no longer arises.

An embodiment is given hereinafter, in the case of the selective hydrogenation of soja oil.

0.58 g of $Co_2(CO)_8$ and 10 g of refined soja oil are placed in a quick-closing, stainless steel, 125 ml autoclave.

The autoclave is placed under a hydrogen pressure of 20 bars. Heating and stirring by balancing are then set into action. In one hour, the temperature reaches 180° C. and is maintained there for one hour. The autoclave is then cooled in a water bath. After decompression, the solid mass is extracted from the autoclave, is rapidly melted, homogenized and cooled suddenly.

The solid obtained contains the micrometallic dispersed cobalt (about 2.1% by weight with respect to the total catalytic mass). The fat matrix is composed as follows:

$C_{16:}$ 12%, $C_{18:0}$ 34%, $C_{18:1}$ 54% (said percentage being expressed by weight of component with respect to the total weight of these components), 35% of the double bonds of these components being the trans form.

lytic mass, comprising a percentage of cobalt expressed in weight and added to the total weight of the oil to be hydrogenated, are placed in a quick-closing, stainless steel, 125 ml autoclave under a hydrogen pressure of between 5 and 15 bars, at a temperature between 180° and 230° C. After a period of time ranging between one hour and four hours, the autoclave is cooled and decompressed. The micrometallic cobalt in suspension is removed from the hydrogenation product by a force of magnetic attraction being exerted thereon by a magnet or electromagnet, depending on the importance of the operation.

Different tests are indicated hereinafter in Table II:

5 g of a neutral soja oil for tests 1 to 3, and a crude soja oil containing 0.6% of free fatty acids and 100 ppm of phosphorus for tests 4 to 6, together with a catalytic mass, are placed in a quick-closing stainless steel, 125 ml autoclave. The operatory conditions, the percentages of cobalt expressed in weight and added to the weight of the oil to be hydrogenated, the percentages of fatty acid and conjugated dienes, expressed in weight and added to the total weight of the components, as well as the precentage of double bonds of these components in the trans form are summarised in the following Table, the control being non-hydrogenated starting soja oil.

In conclusion, it should be noted that the stearic acid composition did not rise considerably.

The linoleic acid did not drop too much compared with the linolenic acid which fell below 2.5%.

The conjugated dienes are in a very small proportion. The appearance of trans isomers, inherent in any hydrogenation of the oils, proves to be limited: 45% at the most of double bonds are trans.

Once the cobalt is recovered, there remain only minute traces of it in the final products. These final products, fluid or semi-concrete, respond to the criteria of stability whether neutral soja oil or crude soja oil is used.

TABLE II

HYDROGENATION OF SOJA OILS BY REDUCED COBALT

| TESTS No. | CONDITIONS T (°C.) | $P_{H2}$ (bars) | Cobalt (%) | Duration (h) | COMPOSITION (g/100 g) C16:0 | C18:0 | C18:1 | C18:2 | C18:3 | Conjugated Dienes | TRANS |
|---|---|---|---|---|---|---|---|---|---|---|---|
| 1 | 200 | 5 | 0.09 | 3½ | 10.6 | 7.5 | 48.4 | 30.9 | 2.4 | 0.3 | 31 |

TABLE II-continued

| HYDROGENATION OF SOJA OILS BY REDUCED COBALT | | | | | | | | | | | | |
|---|---|---|---|---|---|---|---|---|---|---|---|---|
| | CONDITIONS | | | | COMPOSITION (g/100 g) | | | | | | | |
| TESTS No. | T (°C.) | $P_{H2}$ (bars) | Cobalt (%) | Duration (h) | C16:0 | C18:0 | C18:1 | C18:2 | C18:3 | Conjugated Dienes | TRANS |
| 2 | 200 | 15 | 0.03 | 3½ | 10.4 | 11.2 | 49.2 | 26.9 | 1.9 | 0.3 | 39 |
| 3 | 200 | 15 | 0.09 | 1½ | 10.4 | 8.6 | 47.7 | 31.1 | 1.9 | 0.3 | 35 |
| 4 | 220 | 10 | 0.06 | 2 | 10.5 | 8.4 | 44.9 | 34.0 | 2.2 | 0.1 | 36 |
| 5 | 220 | 10 | 0.09 | 2 | 10.9 | 11.1 | 52.6 | 24.5 | 0.8 | 0.1 | 45 |
| 6 | 220 | 5 | 0.06 | 3 | 10.5 | 7.8 | 43.4 | 35.8 | 2.4 | 0.2 | 42 |
| CONTROL | — | — | — | — | 10.6 | 4.3 | 24.1 | 53.0 | 8.0 | — | — |

It can be seen from Table II that excellent results are obtained at temperatures of 200° to 220° C. with cobalt in amounts of about 0.02 to about 0.1 percent by weight of the vegetable oil to be hydrogenated. Thus, according to certain preferred embodiments of the present invention to carry out the hydrogenation of vegetable oils using the micrometallic, magnetically separable catalyst, temperatures of from about 180° C. to about 230° C. are used for times of from about 30 minutes to about four hours. The pressure can be varied over a range, desirably superatmospheric, and is in certain preferred embodiments held at from about five to about 20 bars.

What is claimed is:

1. A process for the selective hydrogenation of glyceride oils, which process comprises preparing a micrometallic cobalt catalyst by subjecting dicobalt octacarbonyl in a vegetable oil to hydrogen pressure at an elevated temperature of about 180° to about 230° C. to obtain as a catalyst micrometallic cobalt in a solid glyceride fat; selectively hydrogenating a vegetable oil under pressure and at an elevated temperature in the presence of the catalyst; and separating the cobalt from the hydrogenated product by magnetic attraction and recovering the separated micrometallic cobalt.

2. A process according to claim 1 wherein the micrometallic cobalt is used again selectively to hydrogenate a vegetable oil.

3. A process according to claim 1 wherein the oil is soybean oil.

4. A process according to claim 1 wherein the hydrogenation time is from about 30 minutes to about four hours.

5. A process according to claim 1 wherein the quantity of cobalt is from about 0.02 to about 0.1 percent by weight of the oil.

6. A process for the selective hydrogenation of vegetable oils in the presence of a catalytic solid which is micrometallic cobalt dispersed in a glyceride fat matrix, the cobalt being separable from the hydrogenation products by the use of magnetic attraction and the hydrogenation products being edible, the process comprising (1) preparing the catalytic solid from dicobalt octacarbonyl and vegetable oil under hydrogen pressure and at an elevated temperature of about 180° to about 230° C. and thereafter cooling and homogenizing the product to obtain the catalytic solid;

(2) selectively hydrogenating a vegetable oil under hydrogen pressure and at an elevated temperature in the presence of the catalyst; and (3) separating the edible hydrogenated end-product and recovering the cobalt by magnetic means.

7. A process according to claim 6 wherein 0.58 g of dicobalt octacarbonyl per 10 g of refined soja oil is placed under 20 bars hydrogen pressure, the mixture is heated for one hour until the temperature of 180° C. is reached, and then the reaction is continued at said temperature for one hour.

8. A process according to claim 7 wherein, after decompression, the solid is extracted and after it is melted, homogenized and suddenly cooled, a solid catalytic preparation is obtained whose fat matrix has the following composition: the percentages being expressed by weight of components with respect to the total weight of said matrix: $C_{16:0}$ 12%, $C_{18:0}$ 34%, $C_{18:1}$ 54%, 36.5% of the double bonds of these components being in trans form.

9. A process according to claim 8 wherein the quantity of cobalt is in the ratio 0.025 to 0.1% for each 5 g of oil, the pressure is from 5 to 20 bars, and the temperature is from 180° to 230° C. for from one to four hours.

10. A process according to claim 9 where soja oil is hydrogenated, and wherein after separating cobalt from the hydrogenated products by magnetic means, from 24 to 35% octadecadienoic acids, including linoleic acid, from 0.8 to 2.5% of octadecatrienoic acids, including linolenic acid, and less than 0.5% of conjugated dienes, are obtained, these percentages being expressed by weight of component with respect to the total weight of end-of-reaction products, 35 to 45% of the double bonds of these components being in trans form.

11. A process according to claim 10 utilizing crude soja oil containing 0.6% of free fatty acids and 110 p.p.m. of phosphorus is hydrogenated, wherein a quantity of catalytic preparation containing $45\times10^{-4}$ g of cobalt per 5 g of said crude soja oil, whose fatty acid composition by weight of component with respect to the total weight of the compounds is: $C_{16:0}$ 10.6%, $C_{18:0}$ 4.3%, $C_{18:1}$ 24.1%, $C_{18:2}$ 53%, $C_{18:3}$ 8%, without trans isomers among these components, under a hydrogen pressure of 10 bars and at a temperature of 220° C., for two hours, and wherein products are obtained whose fatty acid composition by weight of components with respect to the total weight of the end-of-reaction products is: $C_{16:0}$ 10.9%, $C_{18:0}$ 11.1%, $C_{18:1}$ 52.6%, $C_{18:2}$ 24.5%, $C_{18:3}$ 0.8% and 0.1% of conjugated dienes, 45% of the double bonds of these components being in trans form.

12. A process according to claim 10 utilizing a quantity of catalytic preparation containing $45\times10^{-4}$ g of cobalt per 5 g of neutral soja oil with the following composition, expressed by weight of component with respect to the total weight of the oil: $C_{16:0}$ 10.6%, $C_{18:0}$ 4.3%, $C_{18:1}$ 24.1%, $C_{18:2}$ 53%, $C_{18:3}$ 8%, without trans isomers among these components, under a hydrogen pressure of 15 bars, at a temperature of 200° C., for a reaction time of 90 minutes, and products are obtained whose fatty acid composition expressed by weight of component with respect to the total weight of the end-of-reaction products is: $C_{16:0}$ 10.4%, $C_{18:0}$ 8.6%, $C_{18:1}$ 47.7%, $C_{18:2}$ 31.1%, $C_{18:3}$ 1.9%, 35% of the double bonds of these components being in trans form.

* * * * *